United States Patent
Leitch

(10) Patent No.: US 12,276,106 B2
(45) Date of Patent: Apr. 15, 2025

(54) ROOFING SHINGLE AND METHODS OF FORMING ROOFING SHINGLES

(71) Applicant: BMIC LLC, Dallas, TX (US)

(72) Inventor: Olan T. Leitch, Mt. Juliet, TN (US)

(73) Assignee: BMIC LLC, Dallas, TX (US)

( * ) Notice: Subject to any disclaimer, the term of this patent is extended or adjusted under 35 U.S.C. 154(b) by 196 days.

(21) Appl. No.: 17/992,239

(22) Filed: Nov. 22, 2022

(65) Prior Publication Data

US 2023/0193630 A1 Jun. 22, 2023

Related U.S. Application Data

(60) Provisional application No. 63/290,097, filed on Dec. 16, 2021.

(51) Int. Cl.
| | | |
|---|---|---|
| E04D 1/28 | (2006.01) | |
| B32B 3/30 | (2006.01) | |
| B32B 7/12 | (2006.01) | |
| B32B 37/12 | (2006.01) | |
| B32B 38/00 | (2006.01) | |
| E04D 1/26 | (2006.01) | |

(52) U.S. Cl.
CPC .......... *E04D 1/28* (2013.01); *B32B 3/30* (2013.01); *B32B 7/12* (2013.01); *B32B 37/12* (2013.01); *B32B 38/0004* (2013.01); *B32B 38/0012* (2013.01); *E04D 1/26* (2013.01); *B32B 2419/06* (2013.01)

(58) Field of Classification Search
CPC ..................................................... E04D 1/28
See application file for complete search history.

(56) References Cited

U.S. PATENT DOCUMENTS

| | | | | |
|---|---|---|---|---|
| 1,542,475 A | * | 6/1925 | Ruess | E04D 1/26 |
| | | | | 428/168 |
| 2005/0284070 A1 | * | 12/2005 | Binkley | B29C 65/56 |
| | | | | 52/543 |
| 2006/0265990 A1 | * | 11/2006 | Kalkanoglu | E04D 1/26 |
| | | | | 52/518 |
| 2009/0229217 A1 | * | 9/2009 | Binkley | B29C 66/83511 |
| | | | | 52/745.19 |
| 2020/0040582 A1 | * | 2/2020 | Boss | E04D 1/365 |
| 2020/0392748 A1 | * | 12/2020 | Fabbi | E04G 21/3295 |
| 2022/0154469 A1 | * | 5/2022 | Svec | B32B 3/06 |
| 2023/0069674 A1 | * | 3/2023 | Leitch | E04D 1/28 |

FOREIGN PATENT DOCUMENTS

JP 4259752 B2 * 4/2009 ............... B31F 1/07

* cited by examiner

*Primary Examiner* — Joshua K Ihezie
(74) *Attorney, Agent, or Firm* — GREENBERG TRAURIG, LLP

(57) ABSTRACT

Roofing shingles are disclosed that are capable of being attached to a roof deck, underlayment, and/or other roofing shingles and that require fewer mechanical fasteners for attachment. The roofing shingles are formed with a first layer and a second layer of shingle materials that are laminated together, and with the first and second layers further being mechanically attached with indentations, including a first plurality of indentations formed along an upper surface of the first layer and a second plurality of indentations formed along a bottom surface of the second layer at spaced locations along the roofing shingles. A roofing system comprising a plurality of courses of the roofing shingles is also disclosed.

16 Claims, 8 Drawing Sheets

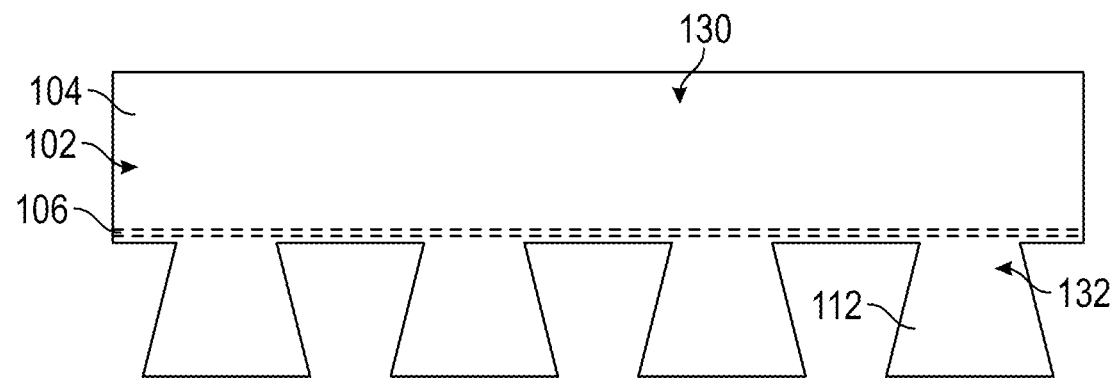
FIG. 2B
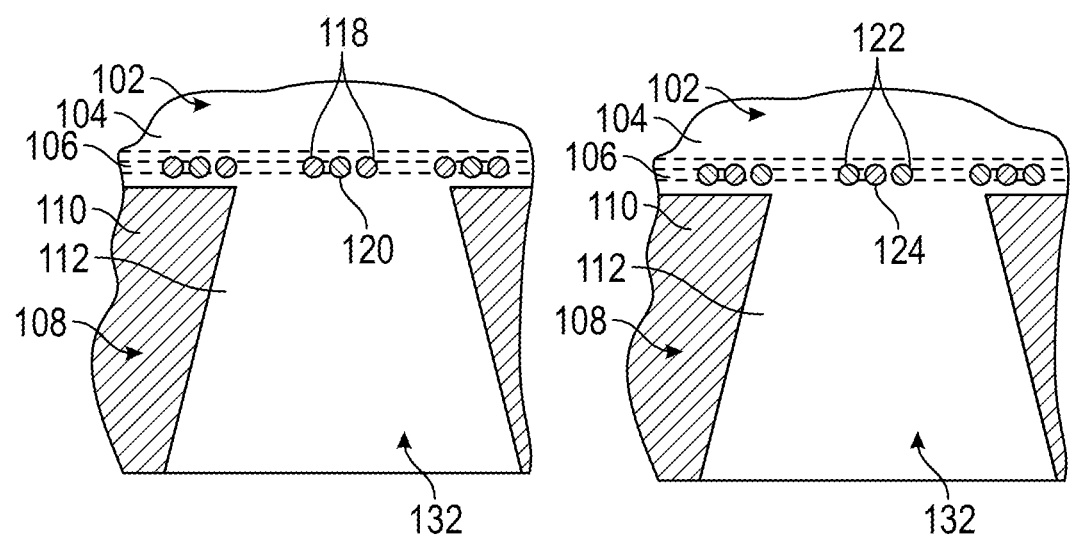
FIG. 2C  FIG. 2D

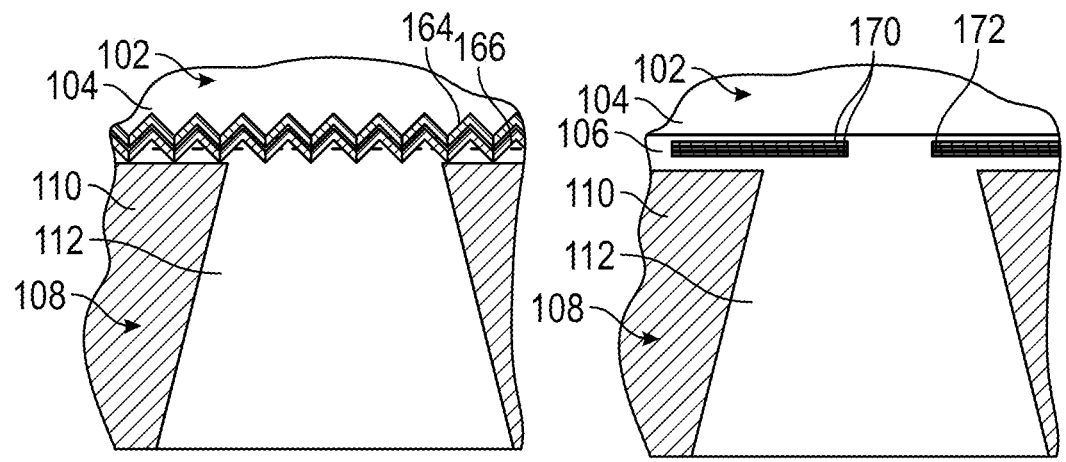
FIG. 2I
FIG. 2J
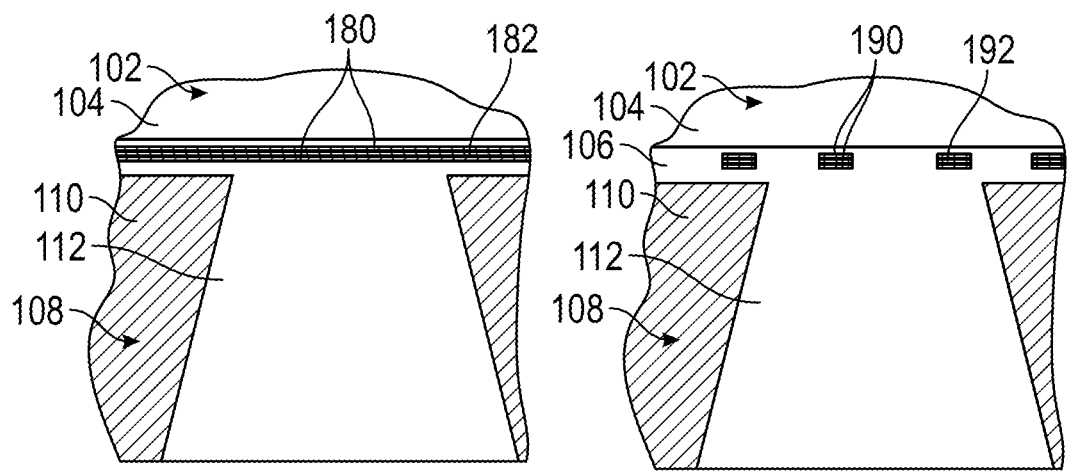
FIG. 2K
FIG. 2L

ROOFING SHINGLE AND METHODS OF FORMING ROOFING SHINGLES

CROSS-REFERENCE

The present patent application claims the benefit of United States Provisional Patent Application No. 63/290,097, filed Dec. 16, 2021.

INCORPORATION BY REFERENCE

The disclosure of the United States Provisional Patent Application No. 63/290,097, filed Dec. 16, 2021, is specifically incorporated by reference herein as if set forth in its entirety.

TECHNICAL FIELD

The present disclosure relates to roofing shingles and methods of forming roofing shingles, and in particular, to roofing shingles comprising a plurality of layers that can be connected by indentations and an adhesive. The present disclosure also relates to a roofing system that utilizes the roofing shingles.

BACKGROUND

Roofing shingles are typically attached to a roof deck with mechanical fasteners such as nails or staples. Such mechanical fasteners can prevent wind uplift of the shingles, and can help hold the laminated layers of shingle materials together and improve the stability of the installed shingles. The need for mechanical fasteners increases installation time and costs because a number of fasteners generally are required to secure all of the shingles to a roof. Furthermore, some shingle designs require that the fasteners be driven through specific locations of the shingles, thus requiring the roofer to pay careful attention to the positioning of the fasteners.

Accordingly, it can be seen that a need exists for roofing shingles with a strengthening of the connection between the layers thereof. The present disclosure addresses these and other related and unrelated issues.

SUMMARY

Briefly described, according to aspects of the present disclosure, embodiments of roofing shingles and methods of making roofing shingles are provided. In embodiments, a roofing shingle can comprise at least a first layer and a second layer opposite the first layer. The first layer may be considered an upper layer of a roofing shingle, while the second layer may be considered a backer or lower layer of the roofing shingle. The first layer can include a headlap portion and an exposure portion. The headlap portion is configured to be overlapped by at least one additional roofing shingle arranged in a next higher course of roofing shingles. In embodiments, the exposure portion of the first layer further can include a plurality of tabs or teeth.

In embodiments, a plurality of indentations are formed in the first and/or second layers, and can include a first plurality of indentations formed or positioned along an upper surface of the first layer and configured to extend through the first layer and at least partially into the second layer, and a second plurality of indentations formed or positioned along a bottom surface of the second layer and configured to extend through the second layer and at least partially into the first layer. The indentations can be configured to form mechanical attachments configured to attach the second layer to the first layer. For example, in embodiments, at least some of the first portion or plurality of the plurality of indentations are formed in registration with a common bond area along the second layer and the first layer (e.g., an area of attachment between the first and second layers); and in embodiments, at least some of the second portion or plurality of the plurality of indentations can be formed in registration with at least some of the plurality of tabs of the exposure portion of the first layer.

In some embodiments, an adhesive, which can be formed as an adhesive strip or dots, can be applied between the first layer and second layer along the common bond area to adhesively attach the first and second layers along the common bond area. According to one aspect of the present disclosure, at least a portion of the first plurality of indentations formed in the first layer and/or at least a portion of the second plurality of indentations formed in the second layer can be formed in registration with the common bond area and the adhesive applied therealong. These indentations can project through the adhesive at the common bond area from opposite sides of the roofing shingles.

In embodiments, a roofing shingle is provided, the roofing shingle including a plurality of indentations configured to form mechanical attachments adapted to couple the first and second layers together, which can enable uses of less adhesive than a roofing shingle with no indentations, or indentations along only one side of the roofing shingle. In some embodiments, at least a portion of the indentations can be applied in a machine direction along the common bond area between the first and second layers of shingle material, while other portions of the plurality of indentations can be formed in other areas of the roofing shingles. Further, the indentations can help cause a substantially complete fusion between the second layer and first layer of the shingle. The resulting roofing shingle can exhibit improved resistance to parallel and perpendicular forces in relation to the roofing shingle, an increased slump performance, and an improved angle shear resistance of the roofing shingles after installation.

Briefly described, various aspects of a roofing shingle, roofing systems, and methods of forming roofing shingles according to the present disclosure include, without limitation.

According to an aspect of the present disclosure, a roofing shingle comprises a first layer comprising a headlap portion configured to be overlapped by at least one additional roofing shingle arranged in a next higher course of roofing shingles, and an exposure portion; a second layer opposite the first layer; and a plurality of indentations comprising a first plurality of indentations positioned along an upper surface of the first layer and configured to extend through the first layer and at least partially into the second layer; and a second plurality of indentations positioned along a bottom surface of the second layer and configured to extend through the second layer and at least partially into the first layer; wherein the first and second pluralities of indentations are configured to attach the first layer to the second layer.

In embodiments of the roofing shingle, the first plurality of indentations and the second plurality of indentations are arranged in opposing groups of indentations along a common bond area between the first layer and the second layer.

In embodiments of the roofing shingle, the first and second pluralities of indentations comprise indentations configured with a chevron-shaped, straight line, circular, square, triangular, rectangular, diamond-shaped, star-shaped, undulating, arched, curved, or hemispherical geometry, or a combination thereof.

In embodiments of the roofing shingle, at least some of the second plurality of indentations are positioned along a portion of the bottom surface of the second layer opposite the exposure portion of the first layer.

In embodiments of the roofing shingle, at least one of the first and second pluralities of indentations comprise at least one substantially continuous indentation extending in line. In some embodiments of the roofing shingle, at least one of the first and second pluralities of indentations comprise spaced lines of indentations.

In embodiments, the roofing shingle, further comprises at least one strip of adhesive applied between the first layer and the second layer along a common bond area between the first layer and the second layer; and wherein at least some of the first and second pluralities of indentations project through the at least one strip of adhesive.

According to another aspect of the present disclosure, a method is provided, comprising moving a substrate of shingle material along a path, the substrate comprising a first layer and a second layer; wherein the first layer comprises: a headlap portion and an exposure portion; forming a plurality of indentations in the substrate, at least some of the plurality of indentations configured to attach the first layer to the second layer, and including at least a first plurality of indentations and a second plurality of indentations; wherein the first plurality of indentations are configured to extend in a first direction through the first layer and at least partially into the second layer; and wherein the second plurality of indentations are configured to extend in a second direction through the second layer and at least partially into the first layer; and cutting the substrate to form a plurality of roofing shingles.

In embodiments of the method, the first and second pluralities of indentations comprise indentations configured with a chevron-shaped, straight line, circular, square, triangular, rectangular, diamond-shaped, star-shaped, undulating, arched, curved, or hemispherical geometry, or a combination thereof; and wherein forming the plurality of indentations in the substrate comprises punching, embossing, crimping, stamping pressing, notching of a combination thereof.

In embodiments of the method, forming the plurality of indentations comprises forming the first plurality of indentations in the first direction from a top side of the first layer of the substrate and forming the second plurality of indentations in the second direction from a bottom side of the second layer of the substrate as the substrate is moved along the path.

In embodiments of the method, forming the plurality of indentations comprises forming the first plurality of indentations and the second plurality of indentations on opposite sides of a common bond area between the first layer and the second layer.

In embodiments, the method further comprises engaging the first layer with a cutter and cutting portions of the first layer to form a plurality of tabs along the exposure portion of the first layer.

In embodiments of the method, forming the plurality of indentations and comprises engaging the substrate with a first tool having at least one punch configured to form the first plurality of indentations and with a second tool having at least one punch configured to form the second plurality of indentations from opposite sides of the substrate as the substrate moves along the path.

In embodiments of the method forming the plurality of indentations comprises engaging the first and second layers with opposed wheels, each having a circumference configured to form the plurality of indentation; and as the substrate moves along the path, the wheels are rotated to form the first and second pluralities of indentations in the substrate.

In embodiments, the method further comprises applying an adhesive material between the first and second layers along a common bond area between the first layer and second layer; and wherein at least a portion of the first plurality of indentations and the second plurality of indentations extend at least partially though an adhesive material.

According to another aspect of the present disclosure, a stack of roofing shingles is provided, comprising a plurality of roofing shingles, wherein at least some of the roofing shingles comprise a first layer having an upper surface and including a headlap portion configured to be overlapped by at least one additional roofing shingle arranged in a next higher course of roofing shingles on a roof, and an exposure portion; a second layer opposite the first layer; and a plurality of indentations formed in the first and second layers and configured to attach the first and second layers together, the plurality of indentations comprising a first plurality of indentations configured to extend through the first layer and at least partially into the second layer; and a second plurality of indentations configured to extend through the second layer and at least partially into the first layer; wherein at least a portion of the first and second pluralities of indentations are formed in a machine direction along the first and second layers; and wherein at least some of the second plurality of indentations are located opposite the exposure portion of the first layer.

In embodiments of the stack of roofing shingles, the first and second pluralities of indentations comprise groups of indentations, each of the groups of indentations comprising indentations configured with a chevron-shaped, straight line, circular, square, triangular, rectangular, diamond-shaped, star-shaped, undulating, arched, curved, or hemispherical geometry, or a combination thereof.

In embodiments of the stack of roofing shingles, the first plurality of indentations and the second plurality of indentations comprise opposing groups of indentations positioned along a common bond area between the first layer and the second layer.

In embodiments, the stack of roofing shingles further comprises at least one strip of adhesive applied between the first layer and the second layer along a common bond area between the first layer and the second layer, and wherein at least some of the first and second pluralities of indentations extend through the at least one strip of adhesive.

According to another aspect of the present disclosure, a roofing system comprises a roof deck, a plurality of roofing shingles positioned on the roof deck, at least a portion of the roofing shingles each comprising a substrate including a first layer having an upper surface, a headlap portion, and an exposure portion; a second layer attached to the first layer and having a bottom surface; a first plurality of indentations positioned along the upper surface of the first layer and configured to extend in a first direction through the first layer and at least partially into the second layer; a second plurality of indentations positioned along the bottom surface of the second layer and configured to extend in a second direction opposite the first direction through the second layer and at least partially into the first layer; wherein the roofing shingles are arranged in overlapping courses of roofing shingles on the roof deck with the headlap portion of each roofing shingle in a lower course attached to an overlapping roofing shingle of a higher course of roofing shingles.

In embodiments of the roofing system, the roofing shingles further comprise at least one strip of adhesive between the first and second layers along the common bond area, and wherein at least some of the first and second pluralities of indentations of the roofing shingles extend into the at least one strip of adhesive.

In an embodiment of the roofing system, the first and second pluralities of indentations comprise groups of indentations, each of the groups of indentations comprising indentations configured with a chevron-shaped, straight line, circular, square, triangular, rectangular, diamond-shaped, star-shaped, undulating, arched, curved, or hemispherical geometry, or a combination thereof.

In an embodiment of the roofing system, the first plurality of indentations and the second plurality of indentations are arranged in opposing groups of indentations along a common bond area between the first layer and the second layer.

Accordingly, embodiments of roofing shingles, roofing systems and methods for forming roofing shingles that are directed to the above discussed and other aspects are disclosed. The foregoing and other aspects of the present disclosure will become apparent and more readily appreciated from the following detailed description, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 2B illustrates a rear view of a first layer of the roofing shingle of FIG. 2A.

FIG. 2C, FIG. 2D, FIG. 2E, FIG. 2F, FIG. 2G, FIG. 2H, FIG. 2I, FIG. 2J, FIG. 2K, and FIG. 2L show a top-down view of a portion of a roofing shingle including different configurations of indentations formed therein, according to embodiments of the present disclosure.

DETAILED DESCRIPTION

Figure 1:
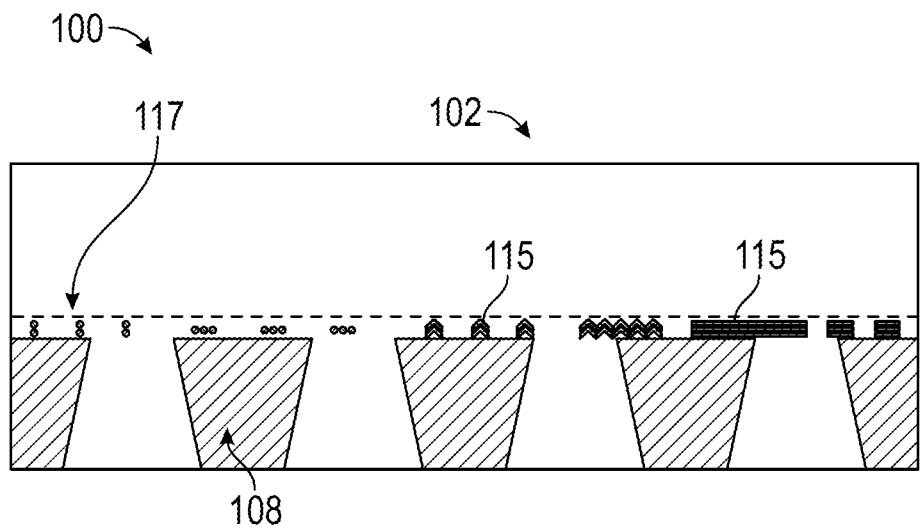
FIG. 1 is a schematic illustration of a roofing shingle with mechanical attachments including a plurality of indentations having various configurations formed in the layers of shingle material of the roofing shingle, according to the principles of the present disclosure.

The embodiments of the present disclosure will now be described in more detail with reference to the attached drawing figures wherein roofing shingles and roofing systems utilizing such roofing shingles 100 are described herein and illustrated in FIGS. 1-6. As schematically illustrated in FIG. 1, the roofing shingles 100 generally are comprised of a substrate that generally includes a first layer and a second layer that can be adhesively attached together, and further will be mechanically bonded by a plurality of indentations that, in embodiments, can be formed along both sides of the roofing shingle and can have a variety of selected configurations. Such roofing shingles are configured to provide increased bond strength between layers, exhibit improved slump performance, and improved angle shear resistance when installed on a roof deck of a roof, such as, for example, residential or other sloped roofs having a pitch or slope greater than 3:12 and in embodiments at least 4:12 or greater as compared to a shingle comprised of layers connected via adhesive and/or fasteners.

In embodiments, as illustrated in FIGS. 1-5B, the roofing shingle 100 includes a first layer 102 and a second layer 108 that each can be formed from shingle materials. The first layer 102 can form an upper layer of the roofing shingle that will be exposed to wind, rain, snow, and/or other environmental forces, and when comprises an exposure portion 132 and a headlap portion 104, and includes an upper surface or portion 130 and a rear surface or portion 202, as illustrated in FIGS. 2A and 3A. The headlap portions 104 (FIGS. 1-2A) of the roofing shingles will be configured to be overlapped by an exposure portion of at least one additional roofing shingle arranged in a next higher course of roofing shingles installed along the roof deck 508 (as illustrated in FIG. 6).

The exposure portion 132 (FIGS. 2A-2B) of the first layer 102 is configured to be exposed after installation of the roofing shingle 100 on a roof deck, and will include a visible portion of the roofing shingle when installed along the roof deck of a roof. In some non-limiting embodiments, the exposure portion 132 can have a plurality of tabs or teeth 112 each having a front surface 133. As indicated in FIG. 3A, the second layer 108 (also referred to as a backer) is attached to a portion of the first layer 102, which attachment can be via application of an adhesive 106. In embodiments, the adhesive 106 can be applied as an adhesive strip, a line or lines, dashes or dots of adhesive as indicated in FIGS. 3A-3B, the second layer 108 further will include a front surface or portion 110 (FIG. 3A) and a bottom surface or portion 111 (FIG. 3B).

Figure 2A:
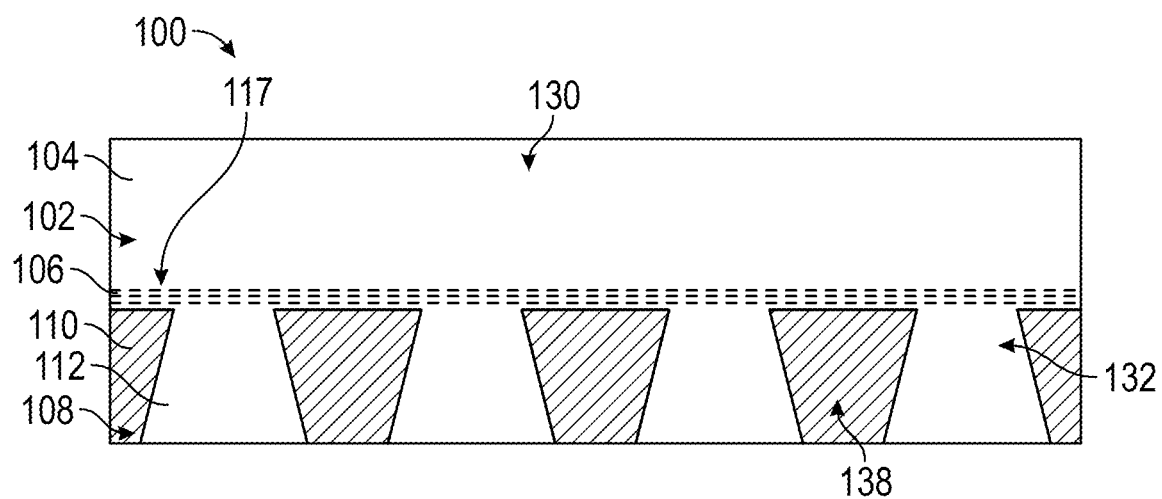
FIG. 2A illustrates an embodiment of a roofing shingle according to the principles of the present disclosure.
Figures 2E, 2F:
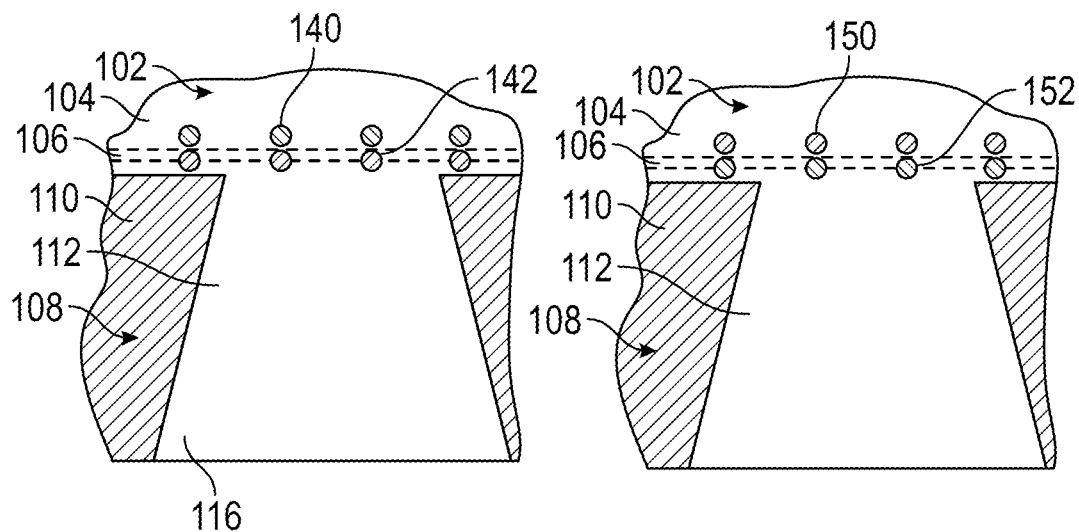
Figures 2G, 2H:
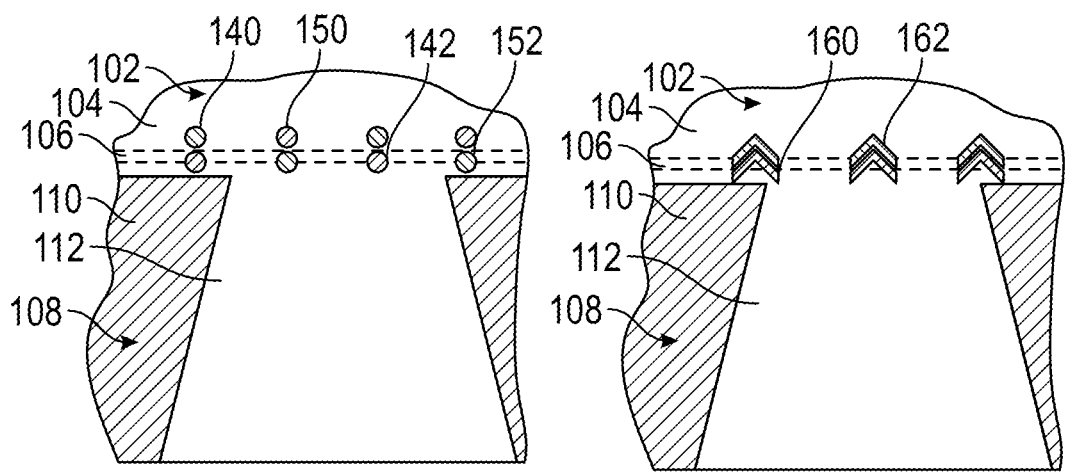
Figure 3A:
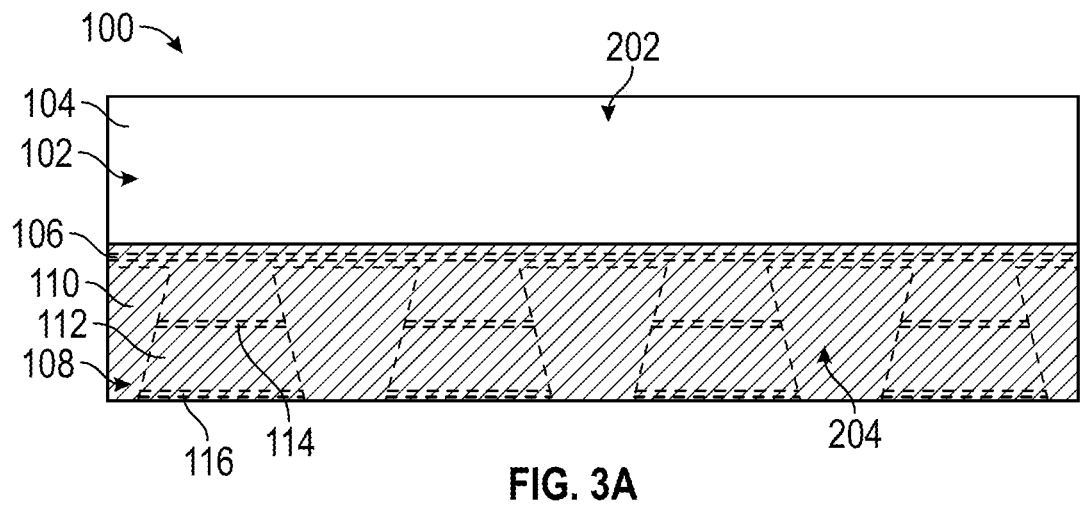
FIG. 3A, FIG. 3B, and FIG. 3C show bottom-up views of a roofing shingle according to additional embodiments of the present disclosure.
Figure 3B:
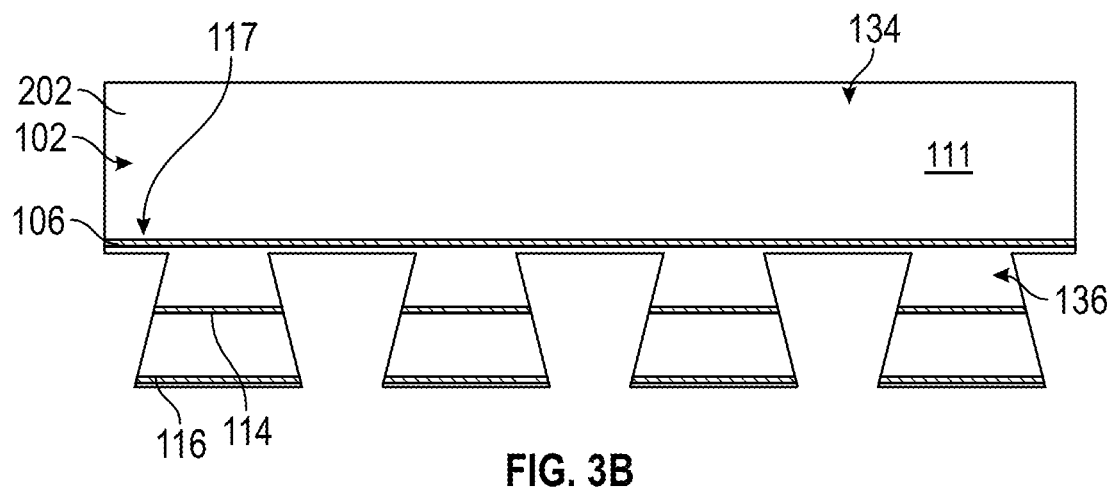
Figure 3C:
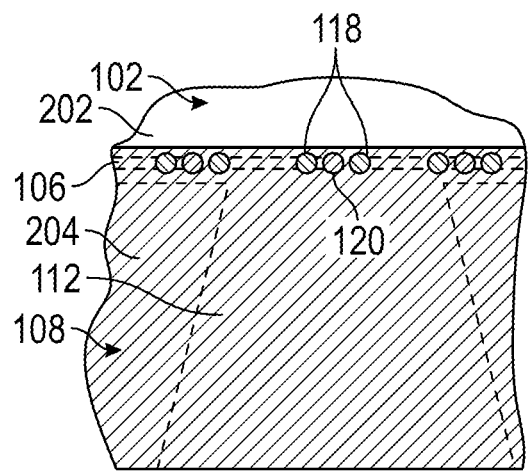

In embodiments, as indicated in FIGS. 2C-2L and 3C to strengthen the connection between the first and second layers without necessarily adding additional adhesive materials therebetween, a plurality of indentations 115 can be formed in the first and second layers. The plurality of indentations 115 can include a first plurality of indentations 118 which can be formed in the first layer 102, e.g., as shown in FIGS. 2C and 3C, and in some embodiments, a second plurality of indentations 122 that can be formed in the second layer 108, e.g., as shown in FIGS. 2D and 3C.

In embodiments, the first plurality of indentations can be punched or otherwise formed in the first layer 102 along the upper surface 130 thereof; and. will extend through the first layer 102 and at least partially into the second layer 108 to a depth configured to form mechanical attachments between the first layer 102 and second layer 108. The indentations of the second plurality of indentations can be punched or otherwise formed in the second layer 108 and can extend through the second layer 108 and at least partially into the first layer 102 to a depth configured to form mechanical attachments between the first layer 102 and second layer 108.

In embodiments, a portion of at least one of the first and second pluralities of indentations can be applied in registration with the adhesive applied along a common bond area 117 at which the first and second layers are adhesively attached. For example, and not limitation, in embodiments, at least a portion of the first plurality of indentations 118 and a portion of the second plurality of indentations 120 can be aligned with and can be formed in registration with the adhesive strip, line or lines, dashes, or dots of the adhesive 106 extending along the common bond area. In some embodiments, portions of the first and second pluralities of indentations also can be formed in opposing positions along other areas of attachment between the first layer 102 and second layer 108; for example, at locations adjacent the headlap portion 104 and along an upper edge of the tabs of the exposure portion. Further, in embodiments, one or more of the first plurality of indentations can be formed adjacent or proximate to and in registration with at least one of the second plurality of indentations thereby forming a pattern, e.g., a crimp like pattern or a pattern of alternating punches or a series of overlapping indentations configured to create an interlocked engagement. Other patterned arrangements of the indentations As further illustrated in FIG. 1, various patterns, shapes, and numbers of indentations 115 can be utilized to strengthen the connection between the first layer 102 and the second layer 108. For example, in embodiments, the indentations can be configured with a chevron-shaped, straight line, circular, square, triangular, rectangular, diamond-shaped, star-shaped, undulating, arched, curved, or hemispherical geometry, or a combination thereof; and can be formed by punching, embossing, crimping, stamping pressing, notching of a combination thereof. The indentations 115 further can be formed substantially side-by-side in the machine and/or cross-machine directions, with gaps or selected spacing's, formed as dashed lines, formed as multiple lines or indentations, including lines of varying indentation depths. In some embodiments, as indicated in FIG. 1 and FIGS. 2C-2L, indentations with configurations such as waves, undulations of chevrons can be formed from both the top down and bottom up.

As a result, the second layer 108 (FIG. 3A) of a shingle material may be substantially fused to the first layer 102 of a shingle material. Furthermore, the roofing shingle 100 can withstand forces, such as due to wind directed against the roofing shingles 100 in parallel and perpendicular directions, e.g. in the machine and cross-machine directions with respect to the roofing shingle 100, providing enhanced protection against separation of the second layer 108 from the first layer 102 of the roofing shingles under such forces, as well as upon exposure to high temperatures, after installation of the roofing shingles 100 along the roof deck of a roof. Further, the roofing shingles 100 can utilize less adhesive and/or less fasteners to attach the roofing shingles 100 to the deck of a roof, and therefore such a roofing shingle can be produced at a lower cost and utilize less resources. Therefore, a less costly yet stronger and more resilient roofing shingle 100 can be provided. In addition, enabling a reduction in the number of fasteners required for attaching the roofing shingles to the deck of the roof can help reduce installation times, and can further facilitate installation of the roofing shingles since an installer will not necessarily be required to apply fasteners to multiple specific locations along the roofing shingles for attachment.

As used herein, the terms "machine direction" and "MD" mean the direction in which layers of shingle material (e.g., the first layer 102 and second layer 108) travel through a production line as the shingle is produced or made. As used herein, the terms "cross-machine direction" and "CD" mean the direction perpendicular to the machine direction along which the material (e.g., the first layer 102 and second layer 108) travels through a production line as the shingle is produced or made. As used herein, the term "in registration with" means in alignment along or in line with. For example, indentations applied in registration with an adhesive line of a common bond area means that the indentations are applied along the adhesive line.

As used herein, the term "common bond area" means the area along at which the first and second layers are attached together across the length of the roofing shingle and at which a nail zone where fasteners are to be inserted to secure the roofing shingle to a roof deck (508 in FIG. 5) is defined. The common bond area 117 (FIG. 2A) generally includes a portion of the roofing shingle 100 along a lower edge or part of the headlap portion 104 of the first layer 102 that is adjacent to the region where the exposure portion overlies a portion of the second layer 108, as illustrated, for example, in FIGS. 2A and 2C, where the second layer is attached to the first layer 102 above the plurality of tabs 112.

While, in embodiments, the adhesive and indentations can be applied additionally elsewhere, the adhesive and the indentations may be applied along the common bond area to provide both an adhesive and a mechanical connection between the second layer 108 and the first layer 102. The resulting roofing shingle therefore may require use of less fasteners to attach the roofing shingles to a roof, and, in embodiments, further can include a narrower common bond area than a common bond area of a typical conventional roofing shingle. For example, in some conventional roofing shingles, the adhesive applied along the common bond area where the fasteners secure the roofing shingle to the deck of a roof can spread or be pressed out from the sides of the common bond area under pressure and temperature over time, while the indentations applied along the common bond area will not be subject to such movement. Thus, in embodiments, the common bond area can be narrower, which can further reduce shingle raw material costs, reduce product weight of the roofing shingles, which can also result in lighter, easier to handle bundles or roofing shingle packages, and can enable stacking of more roofing shingle products per pallet.

FIGS. 2C-2L illustrate expanded views of a portion of the exposure portion 132 and of one of the plurality of tabs 112, showing various non-limiting example embodiments of the first and second pluralities of indentations. As noted, the front surface 110 of the second layer 108 can attach to the rear surface of the first layer 102. In such examples, strips, dots, or beads of various adhesives can be applied to the front surface 110 of the second layer 108 and can attach to the rear surface of the first layer 102. The adhesive can include a contact adhesive, a pressure sensitive adhesive, an asphaltic adhesive, and/or other, similar bonding agent.

As also indicated in FIGS. 3A-3B, the common bond area further generally can include an adhesive strip or strips, a line or lines, dashes, or dots of adhesive 106. In addition, an upper portion and a lower portion of the plurality of tabs 112 can include an upper portion of adhesive 114 and a lower portion adhesive 116 applied thereto. Based on the amount, depth, width or diameter, shape, and/or placement of the indentations, a reduction in an amount of adhesive can be utilized to attach the first and second layers along the common bond area and, in embodiments, along other areas, can be provided. For example, rather than a continuous line or strip of adhesive, dots or discontinuous strips of adhesives can be added to the front surface 110 (FIG. 3A) of the second layer 108 and can attach the front surface 110 of the second layer 108 to the rear surface 202 of the first layer 102. In embodiments, the adhesive 106 applied between the first and second layers can include a contract adhesive, a pressure sensitive adhesive, an asphaltic adhesive, or other, similar bonding agent.

It has been found that the use of mechanical indentations or punches in combination with an adhesive helps reduce slippage of the layers 102 and 108 of the roofing shingles 100 during hot weather when exposed to elevated temperatures of upwards of 120°-130° or more (e.g., slump resistance), meaning that fewer or no nails or other fasteners may need to be positioned directly in the common bond area to hold the layers (e.g., the first layer 102 and the second layer 108) of the roofing shingle 100 together. As a result, the nail zone (e.g., where nails or other mechanical fasteners are used to connect the roofing shingle 100 to a deck or other substrate) is not required to cover the common bond area, facilitating and speeding installation since the installer does not necessarily need to apply fasteners to the common bond area.

In embodiments, the nail zone can have an expanded width due to the indentations projecting between the first and second layers and forming mechanical attachments therebetween. In embodiments, the nail zone has a width of 0.25 inches to 3 inches wide, 0.25 inches to 2.75 inches wide; 0.25 inches to 2.5 inches wide; 0.25 inches to 2.25 inches wide; 0.25 inches to 2 inches wide; 0.25 inches to 1.75 inches wide; 0.25 inches to 1.5 inches wide; 0.25 inches to 1.25 inches wide; 0.25 inches to 1 inch wide; 0.25 inches to 0.875 inches wide; 0.25 inches to 0.75 inches wide; 0.25 inches to 0.5 inches wide; 0.25 inches to 0.375 inches wide; 0.375 inches to 3 inches wide; 0.375 inches to 2.75 inches wide; 0.375 inches to 2.5 inches wide; 0.375 inches to 2.25 inches wide; 0.375 inches to 2 inches wide; 0.375 inches to 1.75 inches wide; 0.375 inches to 1.5 inches wide; 0.375 inches to 1.25 inches wide; 0.375 inches to 1 inch wide; 0.375 inches to 0.875 inches wide; 0.375 inches to 0.75 inches wide; 0.375 inches to 0.5 inches wide; 0.5 inches to 3 inches wide; 0.5 inches to 2.75 inches wide; 0.5 inches to 2.5 inches wide; 0.5 inches to 2 inches wide; 0.5 inches to 1.75 inches wide; 0.5 inches to 1.5 inches wide; 0.5 inches to 1.25 inches wide; 0.5 inches to 1 inch wide, 0.5 inches to 0.875 inches wide; 0.5 inches to 0.75 inches wide; 0.75 inches to 3 inches wide; 0.75 inches to 2.75 inches wide; 0.75 inches to 2.5 inches wide; 0.75 inches to 2.25 inches wide; 0.75 inches to 2 inches wide; 0.75 inches to 1.75 inches wide; 0.75 inches to 1.5 inches wide; 0.75 inches to 1.25 inches wide; 0.75 inches to 1 inch wide; or 0.75 inches to 0.875 inches wide; 0.875 inches to 3 inches wide; 0.875 inches to 2.75 inches wide; 0.875 inches to 2.5 inches wide; 0.875 inches to 2.25 inches wide; 0.875 inches to 2 inches wide; 0.875 inches to 1.75 inches wide; 0.875 inches to 1.5 inches wide; 0.875 inches to 1.25 inches wide; 0.875 inches to 1 inch wide; 1 inch to 3 inches wide; 1 inch to 2.75 inches wide; 1 inch to 2.5 inches wide; 1 inch to 2.25 inches wide; 1 inch to 2 inches wide; 1 inch to 1.75 inches wide; 1 inch to 1.5 inches wide; 1 inch to 1.25 inches wide; 1.25 inches to 3 inches wide; 1.25 inches to 2.75 inches wide; 1.25 inches to 2.5 inches wide; 1.25 inches to 2.25 inches wide; 1.25 inches to 2 inches wide; 1.25 inches to 1.75 inches wide; 1.25 inches to 1.5 inches wide; 1.5 inches to 3 inches wide; 1.5 inches to 2.75 inches wide; 1.5 inches to 2.5 inches wide; 1.5 inches to 2.25 inches wide; 1.5 inches to 2 inches wide; 1.5 inches to 1.75 inches wide; 1.75 inches to 3 inches wide; 1.75 inches to 2.75 inches wide; 1.75 inches to 2.5 inches wide; 1.75 inches to 2.25 inches wide; 1.75 inches to 2 inches; 2 inches to 3 inches wide; 2. inches to 2.75 inches wide; 2 inches to 2.5 inches wide; 2 inches to 2.25 inches wide; 2.25 inches to 3 inches wide; 2.25 inches to 2.75 inches wide; 2.25 inches to 2.5 inches wide; 2.5 inches to 3 inches wide; 2.5 inches to 2.75 inches wide; and 2.75 inches to 3 inches wide. Other widths also can be provided. In embodiments, the nail zone also can be visibly marked with a fine stripe and/or one or more paint or print lines. The fine stripe further may also include be configured to help enhance sealant bonding to the face coating for the roofing shingles.

In embodiments, the resulting roofing shingles 100 of FIGS. 1-5B are configured to withstand high winds or high wind uplift forces roofing shingles 100 are configured to pass or exceed ASTM standards for wind resistance, for example, ASTM D3161 ("Standard test for Wind-Resistance of Asphalt Shingles (Fan-Induced Method) in which roofing shingles are subjected to winds of 110 mph (Class F) for two hours without exhibiting damage), and ASTM D7158 ("Standard Test Method for Wind Resistance of Sealed Asphalt Shingles (Uplift Force/Uplift Resistance Method)," in which the roofing shingles are able to withstand wind uplift speeds of 155 mph (Class G), and in embodiments, 190 mph (Class H) when installed on a roof deck 508 (see FIG. 6). Other tests can be utilized to test the capabilities of the roofing shingle 100.

In embodiments, the roofing shingle 100 further is configured to meet or exceed additional shingle performance standards pursuant to ASTM D3462 and 1CC Evaluation Services Acceptance Criteria AC438, including meeting AC438 long term performance standards for roofing shingles for tear strength, fastener pull-through resistance, plurality, and penetration and asphalt softening; as well as weather resistance (including resistance to accelerated aging due to exposure to UV light), wind driven rain, fire resistance (e.g., in accordance with UL 790 Class C), and protection of weight of displaced surfacing.

In addition, slump performance of the roofing shingles can be determined based on various tests. For example, one test may include heating a vertically hanging roofing shingle 100 for a period of time. As some roofing shingles reach certain elevated temperatures where the adhesive softens and can lose its tack or adhesion, the first layer may separate from the second layer. The roofing shingles 100 described herein are further configured to withstand elevated or higher than normal temperatures (e.g., temperatures of 100° F.-120° F. or greater) as compared to a typical roofing shingle, to maintain the connection or adhesion between the first and second layers of the roofing shingle and resist such potential to separation of the layers. In addition, with multiple lines of indentations formed along and across the roofing shingle and projecting through the layers of the roofing shingles from opposite sides thereof, the resistance to separation of the layers can be improved in both the machine direction and in the cross-machine direction In an embodiment, as indicated in FIGS. 1, 2C-2D and 3C, the mechanical attachments between the layers (e.g., between the first layer 102 and the second layer 108) are formed by the plurality of indentations 115 formed in the first and second layers of shingle materials, which can include first and second pluralities of indentations 118 and 122 (also referred to as punches) in which both layers (e.g., the first layer 102 and the second layer 108) of the roofing shingle 100 are partially punched or pressed to form the indentations in registration with one another and at a depth sufficient to extend into the other layer (e.g., the second layer 108 and the first layer 102) and thus create the mechanical attachments therebetween. In embodiments, the indentations can be formed along the back side and the front side of the roofing shingle 100, and, in some embodiments, will be formed in the area where the adhesive 106 is applied along the common bond area, and in areas where the upper portion adhesive 114 is applied between the second layer and the plurality of tabs 112, and also can be formed where no laminating adhesive is applied between the second layer and the plurality of tabs 112, such as indicated in FIGS. 2C-2L.

Figure 7:
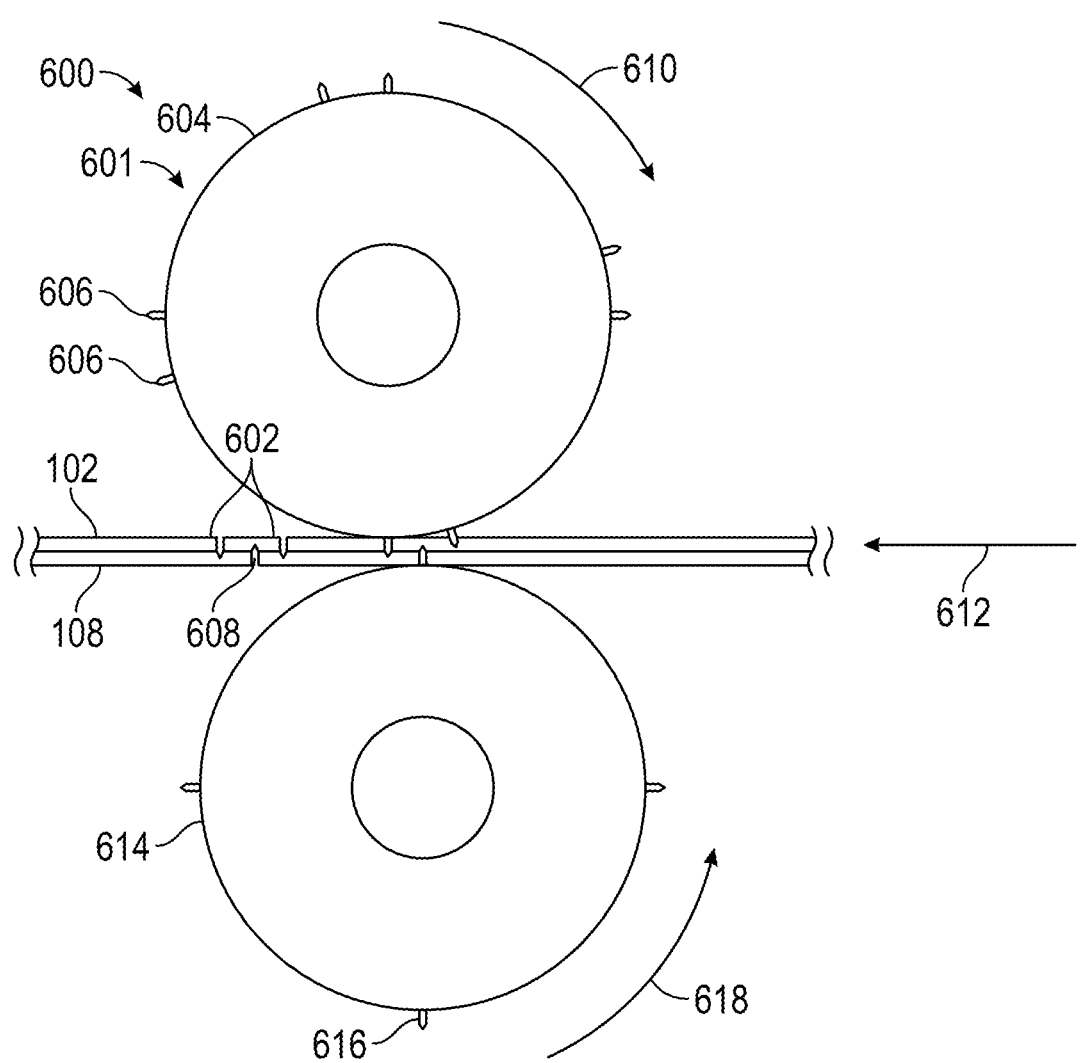
FIG. 7 shows indentation cylinders, each indentation cylinder with a plurality of punches for forming the indentations in registration with the tabs of roofing shingles according to an embodiment of the present disclosure.

The process of applying the indentations can be performed shortly after application of the adhesive 106 and adhesion of the first and second layers of shingle material together to form a roofing shingle substrate as the layers of shingle material are moved along a processing path of a laminating line. The depth of the indentations are formed through the first and second layers also can allow the still flowable adhesive to penetrate more deeply between the layers. In a preferred embodiment, the indentations are created by indentation cylinders, as shown in FIG. 7.

FIGS. 2A-5B show various perspective views of a roofing shingle 100. FIGS. 2A and 2B illustrate the upper surface 130 of a roofing shingle 100, showing the headlap portion 104 or area and exposure portion 132 or area of the first layer 102. The headlap portion 104 can be configured such that the exposure portion and second layer of another roofing shingle can be placed and installed over the headlap portion 104. As such, the lower surface of the second layer opposite the exposure portion of each roofing shingle include strips, lines, dashes, dots, or beads of a sealant material configured to attach to the headlap portion of an adjacent roofing shingle. The exposure portion 132 can include a plurality of tabs 112 as illustrated. The plurality of tabs 112 can also be referred to as teeth or dragon teeth. In embodiments, the shingle materials of the first layer 102 and the second layer can be comprised of asphalt or other suitable materials for forming a roofing shingle.

FIGS. 3A-5B illustrate the second layer 108, including portions of the second layer 108 that are covered by the headlap portion 104 and the plurality of tabs 112 of the first layer. The second layer 108 can be comprised of the same or a different material as the first layer 102. For example, a glass or fiberglass mat, organic felt, woven material, non-woven material, or other conventional shingle materials for formation of asphalt roofing shingles can be used. In embodiments, the first layer 102 can be of a different shade or color than the second layer 108 for creating visual aesthetics or features due to the contrast in color. The front surface 110 of the second layer 108 can be connected to or attached to the back of the first layer 102 by the combination of the adhesives and indentations.

The first and second pluralities of indentations 118 and 122 applied to the second layer 108 and the first layer 102 can comprise a variety of shapes and patterns. As illustrated in FIGS. 1 and 2C-2D, in some embodiments, the indentations of the first and second pluralities of indentations 118 and 122 may be circular, and at least a first portion of the plurality of indentations, e.g., a first plurality of indentations 118 and/or a second plurality of indentations 122, can be applied in registration with the strip, line, bead, dashes, dots, or combination thereof, of the adhesive 106 extending along the common bond area between the first and second layers. In addition, another portion of the plurality of indentations, e.g., at least a portion of the second plurality of indentations 122, can be applied in registration with one or more strips, lines, beads, dashes, dots, or combinations thereof, of the upper portion adhesive 114 and the lower portion adhesive 116 (FIGS. 3A-3B), applied between the second layer and the tabs of the exposure portion of the first layer. In some embodiments, still other ones of the indentations can be applied at various other positions, such as at an upper portion or a lower portion of the plurality of tabs 112. For example, the indentations can be applied in registration with the tabs, but not along the strips, lines, beads, dashes, dots, or combinations thereof, of the upper portion adhesive 114. Further, while a number of indentations of a particular size are illustrated in FIGS. 2C-2L, it will be understood that the number and size of the indentations can vary, e.g., larger or smaller indentations, more or less indentations, and/or indentations applied in additional and/or differing locations.

In an embodiment, the depth (e.g., a punch or indentation depth) of the indentations is 0.1 inches to 0.25 inches, 0.1 inches to 0.2 inches; 0.11 inches to 0.18 inches; 0.12 inches to 0.16 inches, 0.13 inches to 0.15 inches. In an embodiment, the depth of the indentations is 0.125 inches. In embodiments, the depth of the indentations can be less than 90% of the thickness of the common bond area; less than 80% of the thickness of the common bond area; less than 70% of the thickness of the common bond area; less than 60% of the thickness of the common bond area; less than 50% of the thickness of the common bond area; or less than 40% of the thickness of the common bond area. Other thicknesses also can be used. In addition, in embodiments, the depths of penetration and configurations of different ones or groups of the indentations can be varied.

In embodiments, the depth (e.g., a length or depth of a punch or indentation) of the indentations is 0.05 inches to 0.15 inches; 0.05 inches to 0.125 inches; 0.05 inches to 0.10 inches; 0.05 inches to 0.075 inches; 0.075 inches to 0.15 inches; 0.075 inches to 0.125 inches; 0.075 inches to 0.1 inches; 0.1 inches to 0.15 inches; 0.1 inches to 0.125 inches, or 0.125 inches to 0.15 inches. Other indentation lengths also can be provided.

In an embodiment, the width (e.g., punch or indentation width) of the indentations is 0.1 inches to 1 inch; 0.1 inches to 0.75 inches; 0.1 inches to 0.5 inches; 0.1 inches to 0.25 inches; 0.2 inches to 1 inch; 0.2 inches to 0.75 inches; 0.2 inches to 0.5 inches; 0.2 inches to 0.25 inches; 0.25 inches to 1 inch; 0.25 inches to 0.75 inches; 0.25 to 0.5 inches; 0.5 inches to 1 inch; 0.5 inches to 0.75 inches; 0.75 inches to 1 inch. In an embodiment, the width of the indentations is 0.25 to 0.30 inches. Other indentation widths also can be provided.

In some embodiments, the radius (e.g., punch or indentation radius) of a rounded portion of the indentations is 0.05 inches to 0.7 inches; 0.05 inches to 0.6 inches; 0.05 inches to 0.5 inches; 0.05 inches to 0.4 inches; 0.05 inches to 0.3 inches; 0.05 inches to 0.2 inches; 0.05 inches to 0.15 inches; 0.1 inches to 0.7 inches; 0.1 inches to 0.6 inches; 0.1 inches to 0.5 inches; 0.1 inches to 0.4 inches; 0.1 inches to 0.3 inches; 0.1 inches to 0.2 inches; or 0.1 inches to 0.15 inches; 0.2 inches to 0.7 inches; 0.2 inches to 0.6 inches; 0.2 inches to 0.5 inches; 0.2 inches to 0.4 inches; 0.2 inches to 0.3 inches; 0.2 inches to 0.25 inches; 0.3 inches to 0.7 inches; 0.3 inches to 0.6 inches; 0.3 inches to 0.5 inches; 0.4 inches to 0.7 inches; 0.4 inches to 0.6 inches; 0.4 inches to 0.5 inches; 0.5 inches to 0.7 inches; 0.5 inches to 0.6 inches; or 0.6 inches to 0.7 inches. In an embodiment, the radius of the rounded portion of the indentations is 0.125 to 0.15 inches. Other indentation radii also can be provided.

In an embodiment, the spacing (e.g., punch or indentation spacing) of the indentations is 0.1 inches to 5 inches; 0.1 inches to 4 inches; 0.1 inches to 3 inches; 0.1 inches to 2.5 inches; 0.1 inches to 2 inches; 0.1 inches to 1.5 inches; 0.1 inches to 1 inch; 0.1 inches to 0.5 inches; 0.25 inches to 2.5 inches; 0.25 inches to 2 inches; 0.25 inches to 1.5 inches; 0.25 inches to 1 inch; 0.25 inches to 0.5 inches; or 0.5 inches to 2 inches; 0.5 inches to 1.5 inches; 0.5 inches to 1 inch; 1 inch to 5 inches; 1 inch to 4 inches; 1 inch to 3 inches; 1 inch to 2 inches; 1 inch to 1.5 inches; 1.5 inches to 5 inches; 1.5 inches to 4 inches; 1.5 inches to 3 inches; 1.5 inches to 2 inches; 2 inches to 5 inches; 2 inches to 4 inches; 2 inches to 3 inches; 3 inches to 5 inches; 3 inches to 4 inches; or 4 inches to 5 inches. In an embodiment, the spacing of the indentations is 1.5 to 2 inches. Other indentation spacings also can be provided. For example, and without limitation, the indentations can be formed in substantially equally spaced groups, formed at different spacings, or combinations thereof.

It has been found that by selection of an appropriate size, geometry, and spacing of the indentations, cracking of the shingle during handling of the shingle bundle prior to installation is reduced.

As noted, different shapes and/or patterns can be utilized for the indentations. For example, as illustrated in FIG. 2D, at least a portion of the indentations 122 of the second plurality of indentations 120 may be formed through the second layer and extend into the first layer, while at least a portion of the indentations 124 of the first plurality of indentations may be formed through the first layer into the second layer, in a pattern opposite that illustrated in FIG. 2C. In other embodiments, additional indentations may be formed in varying other patterns similar to that of the patterns in FIG. 2C and FIG. 2D.

In some embodiments, as illustrated in FIG. 2E, a first plurality of indentations 140 can be formed through the second layer and into the first layer, and a second plurality of indentations 142 can be formed below indentations 140 and through the first layer into the second layer, thus creating an over-under type pattern. In FIG. 2F, a similar over-under pattern can be formed, with a first plurality of indentations 150 (e.g., through the first layer into the second layer) above a second plurality of indentations 152 (e.g., through the second layer into the first layer). In FIG. 2G, a combination of the patterns illustrated in FIG. 2E and FIG. 2F is shown, where a first plurality of indentations (e.g., indentations 140 and 142) is formed and then a second or next plurality of indentations (e.g., indentations 150, 152) is formed.

In other example embodiments, such as shown in FIG. 2H, chevron shaped indentations 160 and 162 can be utilized for the roofing shingle 100, with each set of indentations spaced apart at a particular distance. A first plurality of chevron shapes 160 can be formed through the first layer and into the second layer, while a second plurality of chevron shapes 162 can be formed through the second layer into the first layer. In FIG. 2I, the first plurality of chevron shapes 160 and the second plurality of chevron shapes 162 utilized for the roofing shingle can be formed in a continuous pattern.

In FIG. 2J, lines can be utilized for the first and second pluralities of indentations 170 and 172. The first and second pluralities of indentations 170 and 172 each can include one or more lines extending along the roofing shingle, and with each of the lines spaced at a particular distance apart. The first plurality of lines 170 can be formed through the first layer and into the second layer, while the second plurality of lines 172 can be formed through the second layer into the first layer. The first plurality of lines 170 may be located under and/or over the second plurality of lines 172.

In FIG. 2K, the first and second pluralities of indentations 180 and 182 include substantially continuous lines positioned and extending along the common bond area, with the lines of the first plurality of indentations 180 (which can be formed in and extending through the first layer into the second layer) located over and/or under the lines of the second plurality of indentations 182 (which can be formed in and extending through the second layer into the first layer).

In FIG. 2L, the first and second pluralities of indentations 190 and 192 include one or more sets of lines that can be smaller or shorter than the lines in FIG. 2J, with the first plurality of indentations 190 including lines formed through the first layer into the second layer and the second plurality of indentations 192 including lines formed through the second layer into the first layer. In other embodiments, the geometry of the indentations can be varied, for example, including a hemisphere (also referred to as a dome), half moon, rounded rectangle, rounded pin, rivet and/or bar. Other patterns and/or shapes can be utilized.

FIG. 3A, FIG. 3B, and FIG. 3C show bottom-up views of a roofing shingle 100 according to additional embodiments of the present disclosure. The front surface 138 of the second layer 108 can be applied to a rear surface 202 of the first layer 102. The front surface of the second layer, or the rear surface 202 of the first layer 102 or both, can include strips, lines, dashes, beads, dots, or combinations thereof, or other suitable applications of adhesive 106 applied thereto, e.g., along the common bond area. The second layer 108 will positioned over the rear surface of the first layer 102 (e.g., the plurality of tabs and a portion of the headlap portion 104), and the layers adhesively attached. Thereafter, the pluralities of indentations can be applied at various locations along the common bond area (e.g., proximate to or nearby adhesive 106). The indentations will push through the second layer 108 and are into the first layer 102 and through the first layer 102 into the second layer 108.

Figure 4:
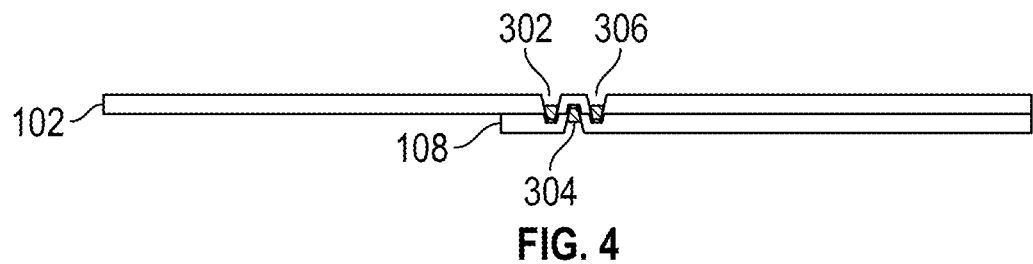
FIG. 4 shows a side view of various roofing shingles according to embodiments of the present disclosure.

FIG. 4 shows a side view of a roofing shingle 100 according to embodiments of the present disclosure. For example, in FIG. 4, the roofing shingle 100 can include a first layer 102 and a second layer 108 with a plurality of indentations 115 projecting therebetween in opposite directions. Several indentation cross-sections are shown. For example, the plurality of indentations 115 can include a first plurality of indentations 302 and 306 that project push through the first layer 102 and into the layer 108 layer 102 and a second plurality of indentations 304 that project through the second layer 108 and into the first layer 102. Thus, the shingle material of the second layer 108 can be fused with the shingle material of the first layer 108, but not being visible from the front of the roofing shingle. As also indicated, in embodiments, the indentations can be formed in an alternating sequence, or in a staggered or parallel arrangement across the roofing shingles, e.g., as shown in FIG. 1.

Figure 5A:
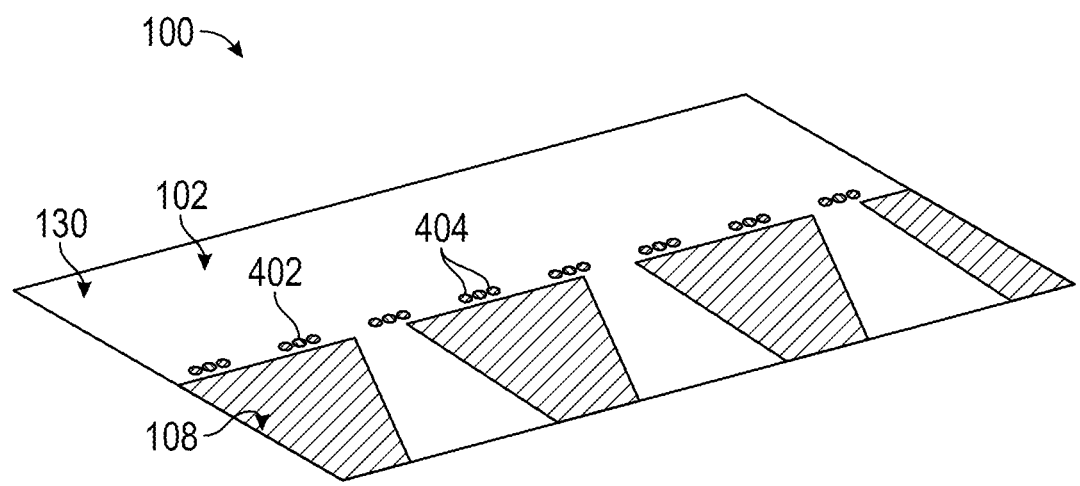
FIG. 5A and FIG. 5B show perspective views of the top side and bottom side of a roofing shingle according to embodiments of the disclosure.
Figure 5B:
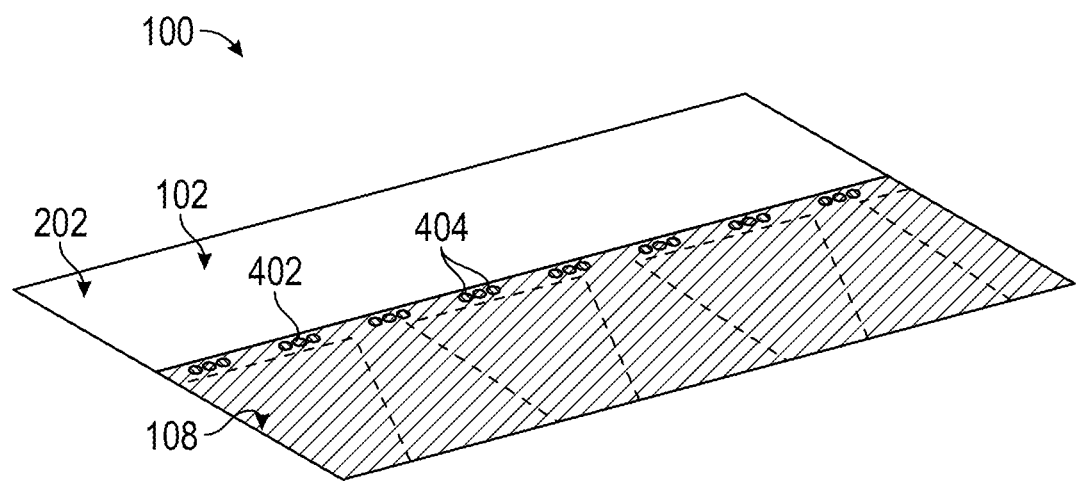
Figure 6:
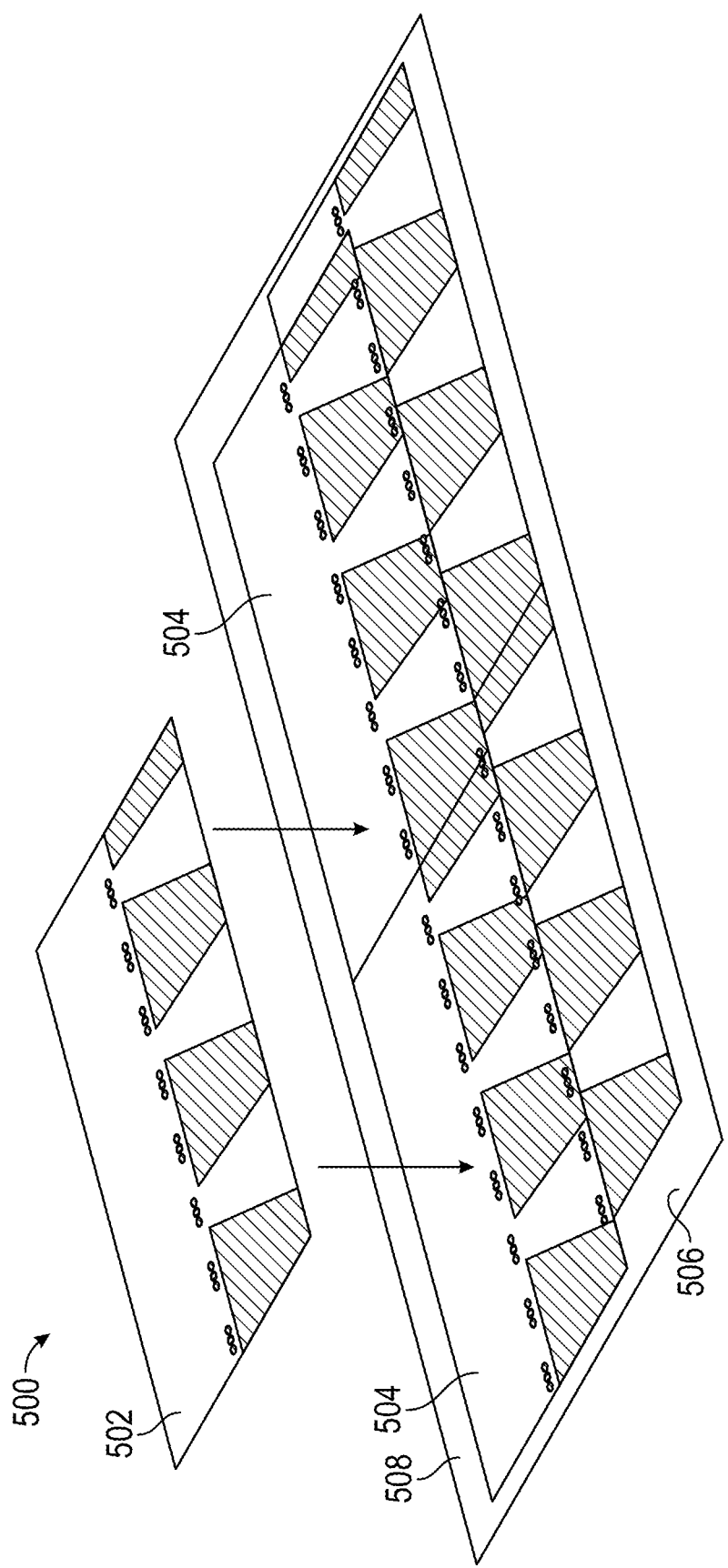
FIG. 6 shows a roofing system according to an embodiment of the present disclosure.

FIG. 5A and FIG. 5B show perspective views of the top side and bottom side of a roofing shingle 100, according to embodiments of the disclosure. As noted, the roofing shingle 100 may include a number of indentations such as shown at 402 and 404 in FIGS. 5A and 5B. It will be understood that additional or less indentations of varying sizes, shapes, and/or formed in various patterns can be utilized.

FIG. 6 shows a roofing system 500 according to an embodiment of the present disclosure. FIG. 6 illustrates a number of roofing shingles 502, 504, and 506 in courses over a roof deck 508. In an embodiment, a sealant material can be utilized to install the roofing shingles 502, 504, and 506, and in some embodiment, lines of sealant materials or sealant strips can be used, in addition to mechanical fasteners or connectors, or in place of mechanical fasteners or connectors.

In an embodiment, the dots, dashes, strips, lines, or combinations thereof, of the sealant material can be configured for are capable of aggressively attaching a roofing shingle 100 to other roofing shingles and to the roof deck upon installation. Preferably, the sealant material has initial tack at low temperatures (so as to provide wind resistance during cold weather applications). In a preferred embodiment, the sealant material has adequate viscosity to resist flow at elevated temperatures (for example, above 100° F.) so as to prevent shingles from sliding off high pitch roofs at elevated temperatures. Suitable sealant materials can, but are not limited to, include bitumen-based sealants, polymer-modified bitumen sealants, butyl adhesives, chloroform adhesives, acrylic adhesives, polyurethane adhesives, epoxies, solvent-based adhesives, emulsion adhesives, cyanoacrylates, and combinations thereof. In an embodiment, the sealant can be covered with a release tape that is removed prior to installation. In an embodiment, the release tape can be functionalized so that the sealant is activated upon unpacking from the shingle bundle, thus providing rapid curing upon installation. The sealant strips may comprise dots, dashes, strips, lines, or combinations thereof, of sealant material, and, in embodiments can be continuous, dashed or dotted and may extend across the full length of the shingle, or a part length. In an embodiment, the sealant strips extend across substantially the entire length of the shingle.

In an embodiment, the shingles are applied directly to the roof deck. The sealant may be selected to give optimal adhesion to the materials of the roof deck (for example, wood roof decks, concrete roof decks, metal roof decks, fiber cement boards, plastic composite boards, or coated surfaces).

In another embodiment, an underlayment is present between the shingles and the roof deck. The underlayment surface may be specifically functionalized to have strong chemical affinity towards the shingle sealant materials in contact with the underlayment.

FIG. 7 schematically shows a system 600 and method of forming the roofing shingles 100. As the roofing shingles move through the system 600, the roofing shingles will be subjected to engagement with one or more tools 601 configured to punch, crimp, or otherwise form a plurality of indentations 115 in the roofing shingles 100, e.g. a first plurality of indentations 118 extending down through the first layer 102 and at least partially into the second layer 108; and a second plurality of indentations extending upward through the second layer 108 and at least partially into the first layer 102 as shown in FIG. 1, at selected areas along the first and second layers of the roofing shingles.

In embodiments, as illustrated in FIG. 7, the tools 601 for forming the indentations can include indentation cylinders 604 and 614, punches, crimping dies, patterned tools such as wheels or rollers having a circumferential edge with a shaped configuration (e.g., wavy, with spaced teeth or projections, etc.). The tools further can be arranged in pairs or sets of tools. Such pairs or sets of tools (e.g., the first and second indentation cylinders 604 and 614) can be arranged along opposite sides of a path of travel 612 of the roofing shingles and in embodiments, can be arranged in an opposing relationship to form both the first plurality of punches and the second plurality of punches in the roofing shingles in opposite directions. In embodiments, the first and second pluralities of indentations can be formed sequentially or substantially at the same time.

For example, in some non-limiting embodiments, the tools 601 of the system 600 can include a first indentation cylinder 604 and a second indentation cylinder 614 engaging the first and second layers to form indentations along the tabs of the roofing shingle according to an embodiment of the present disclosure. In embodiments, a substrate comprising a first layer 102 and a second layer 108 of shingle material can be fed into the system 600. The first layer 102 and second layer 108 of shingle material will move through the system 600 along a processing path in a machine direction indicated by arrow 612. Adhesive materials will be applied to at least one of the layers of shingle material, such as along a common bond area, and can additionally be applied at spaced locations between an exposure portion of the first layer of the shingle materials and the second layer of the shingle material, upstream from the indentation cylinders. The layers of shingle material will be pressed into adhesive contact or otherwise be laminated together to form a laminate web or sheet of shingle material, after which a plurality of tabs can be engaged by one or more cutting cylinders that cut into the first layer 102 and one or more roofing shingles can be cut from the sheet of shingle material.

As illustrated in FIG. 7, as the shingle material continue to move through the system 600, the first and second layers will be engaged by the first and second indentation cylinders to form the first and second pluralities of indentations therein. The first indentation cylinder 604 and the second indentation cylinder 614 will engage the roofing shingles with sufficient force to form a plurality of indentations (e.g., a first plurality of indentations 118 and a second plurality of indentations 122) in the shingle material, with the indentations extending in opposing directions and configured and extending to an indentation depth sufficient to form mechanical attachments between the second layer 108 to the first layer 102.

For example, the nibs or punches of the first or upper indentation cylinder engage the first layer from the top surface thereof, punching downward through the first layer and at least partially into the second layer; while the nibs or punches of the lower or second indentation cylinder can engage the second layer of the roofing shingles from the bottom surface thereof, punching upward through the second layer and at least partially into the first layer. Where the indentations are formed along the common bond area, substantially opposed ones of the first and second indentations can form a ridge or crimped area therebetween that the upper punch may have to pull through to separate the common bond between the first and second layers.

In embodiments, nibs, punches or other embossing or indenting features of the first indentation cylinder 604 and the second indentation cylinder 614 are configured to create the pluralities of indentations having various selected configurations (e.g. chevrons, circles, lines, dashes, semi-circular, square, rectangular, triangular, diamond-shaped, star-shaped, undulating, wavy, arched, curved, a hemispherical geometry, or combinations thereof), via nibs or punches 606 and 616, respectively, spaced about the first indentation cylinder 604 and the second indentation cylinder 614. While first and second indentation cylinders are shown in an example embodiment, other tools also can be used; for example, in embodiments, a series of opposed wheels having patterned circumferential edges, or pairs of opposing jaws having a series of teeth, can be located at spaced positions across the path of travel of the roofing shingles and can engage the first and second layers from opposite sides at substantially the same time or at substantially opposed, aligned locations, or at staggered intervals. Other stamping dies, plates or embossing tools also can be used to form the first and second pluralities of indentations from opposite sides of the roofing shingles.

In embodiments, the first indentation cylinder 604 and the second indentation cylinder 614 can be of the same circumference as the cutting cylinder that cuts the shingle materials to form the roofing shingles and can rotate in registration with the cutting cylinder. In addition, in some embodiments, the first indentation cylinder 604 also can comprise the cutting cylinder that cuts the shingle material into the roofing shingles, and the second indentation cylinder 614 can comprise an anvil or bearing cylinder against which the shingle material is engaged for cutting. The first indentation cylinder 604 will rotate in a direction indicated by 610 and the second indentation cylinder 614 will rotate in a direction indicated by 618. Each of the indentation cylinders of the system 600 can press the shingle material of the roofing shingles into the opposite indentation cylinder.

In an embodiment, the indentation cylinders are configured to create a plurality of machine direction indentations in the roofing shingle. At least one or both of the indention cylinders also can create a plurality of indentations in the cross-machine direction. The indentations will be formed in the first and second layers of the roofing shingles at various spaced locations along and in registration with the common bond area and can be formed to penetrate into the adhesive at the commons bond area, and/or can be separate from the adhesive in the common bond area. Still other portions of the indentations can be formed at various spaced locations along and in registration with areas where the tabs of the exposure portion of the first layer are adhesively attached to the second layer. The machine and cross-machine direction indentations also can be located in areas that are not in registration with the adhesive strips or dots attaching the tabs to the second layer.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure.

The invention claimed is:

1. A roofing shingle, comprising:
a first layer comprising:
  a headlap portion configured to be overlapped by at least one additional roofing shingle arranged in a next higher course of roofing shingles, and an exposure portion;
a second layer opposite the first layer; and
multiple groups of indentations, each group comprising:
a pair of first indentations spaced apart by a first distance and positioned along an upper surface of the first layer and extending through the first layer and at least partially into the second layer; and
  a second indentation positioned along a bottom surface of the second layer between the pair of first indentations and extending through the second layer and at least partially into the first layer;
wherein at least two groups of indentations are spaced apart by a second distance that is greater than the first distance, and the multiple groups of indentations attach the first layer to the second layer.

2. The roofing shingle of claim 1, wherein each pair of first indentations and the second indentations are arranged in opposing groups of indentations along a common bond area between the first layer and the second layer.

3. The roofing shingle of claim 1, wherein the first and second indentations are configured with a chevron-shaped, straight line, circular, square, triangular, rectangular, diamond-shaped, star-shaped, undulating, arched, curved, or hemispherical geometry, or a combination thereof.

4. The roofing shingle of claim 1, wherein the second indentations are positioned along a portion of the bottom surface of the second layer opposite the exposure portion of the first layer.

5. The roofing shingle of claim 1, further comprising at least one strip of adhesive applied between the first layer and the second layer along a common bond area between the first layer and the second layer, and wherein at least one of the first pair of indentations and the second indentations project through the at least one strip of adhesive.

6. A method, comprising:
moving a substrate of shingle material along a path, the substrate comprising a first layer and a second layer;
wherein the first layer comprises:
  a headlap portion and
  an exposure portion;
forming multiple groups of indentations in the substrate, at least some of the multiple groups of indentations configured to attach the first layer to the second layer, and including at least one pair of first indentations spaced apart by a first distance and at least one second indentation located between the at least one pair of first indentations;
wherein the at least one pair of first indentations extend in a first direction through the first layer and at least partially into the second layer, and
wherein the at least one second indentation extends in a second direction through the second layer and at least partially into the first layer; and
cutting the substrate to form a plurality of roofing shingles.

7. The method of claim 6, wherein the multiple groups of indentations comprise indentations configured with a chevron-shaped, straight line, circular, square, triangular, rectangular, diamond-shaped, star-shaped, undulating, arched, curved, or hemispherical geometry, or a combination thereof; and wherein forming the multiple groups of indentations in the substrate comprises punching, embossing, crimping, stamping pressing, notching of a combination thereof.

8. The method of claim 6, wherein forming the multiple groups of indentations comprises forming the at least one pair of first indentations in the first direction from a top side of the first layer of the substrate and forming the at least one second indentation in the second direction from a bottom side of the second layer of the substrate as the substrate is moved along the path.

9. The method of claim 6, wherein forming the multiple groups of indentations comprises forming the at least one pair of first indentations and the at least one second indentation on opposite sides of a common bond area between the first layer and the second layer.

10. The method of claim 6, further comprising engaging the first layer with a cutter and cutting portions of the first layer to form a plurality of tabs along the exposure portion of the first layer.

11. The method of claim 6, wherein forming the multiple groups of indentations comprises engaging the substrate with a first tool having at least one punch configured to form the at least one pair of first indentations and with a second tool having at least one punch configured to form the at least one second indentation from opposite sides of the substrate as the substrate moves along the path.

12. The method of claim 6, wherein forming the multiple groups of indentations comprises engaging the first and second layers with opposed wheels, each having a circumference configured to form the multiple groups of indentations; and as the substrate moves along the path, the wheels are rotated to form the at least one pair of first indentations and the at least one second indentation in the substrate.

13. The method of claim 6, further comprising applying an adhesive material between the first and second layers along a common bond area between the first layer and second layer and wherein the at least one pair of first indentations and the at least one second indentation extend at least partially through the adhesive material.

14. A roofing shingle, comprising:
a first layer comprising:
a headlap portion configured to be overlapped by at least one additional roofing shingle arranged in a next higher course of roofing shingles, and
an exposure portion;
a second layer opposite the first layer;
a first plurality of indentations extending in a first direction through the first layer and at least partially into the second layer; and
a second plurality of indentations extending in a second direction through the second layer and at least partially into the first layer, wherein
the first plurality of indentations extend along a first line located between the headlap portion and the exposure portion, and
the second plurality of indentations extend along a second line parallel to the first line, the second line located between the headlap portion and the exposure portion.

15. The roofing shingle of claim 14, wherein
the first plurality of indentations extend along the second line and individually alternate with respective ones of the second plurality of indentations along the second line; and
the second plurality of indentations extend along the first line and individually alternate with respective ones of the first plurality of indentations along the first line.

16. The roofing shingle of claim 14, wherein the first and second pluralities of indentations are configured with a chevron-shaped, straight line, circular, square, triangular, rectangular, diamond-shaped, star-shaped, undulating, arched, curved, or hemispherical geometry, or a combination thereof.

* * * * *